United States Patent [19]
Nicklos et al.

[11] Patent Number: 6,104,573
[45] Date of Patent: *Aug. 15, 2000

[54] INTEGRAL LIFT WING FOR A DISK DRIVE ACTUATOR

[75] Inventors: Carl F. Nicklos; Thomas J. Angellotti; Robert S. Patterson, all of Ogden, Utah

[73] Assignee: Iomega Corporation, Roy, Utah

[*] Notice: This patent issued on a continued prosecution application filed under 37 CFR 1.53(d), and is subject to the twenty year patent term provisions of 35 U.S.C. 154(a)(2).

[21] Appl. No.: 08/866,171

[22] Filed: May 30, 1997

[51] Int. Cl.⁷ .............................. G11B 5/54; G11B 21/22
[52] U.S. Cl. .......................................................... 360/105
[58] Field of Search ................................... 360/104, 105, 360/106

[56] References Cited

U.S. PATENT DOCUMENTS

| | | | |
|---|---|---|---|
| 4,051,735 | 10/1977 | Johnson et al. | 74/25 |
| 4,052,746 | 10/1977 | Weller | 360/109 |
| 4,504,879 | 3/1985 | Toldi et al. | 360/105 |
| 4,663,677 | 5/1987 | Griffith et al. | 360/71 |
| 4,663,682 | 5/1987 | McNeil | 360/105 |
| 4,663,686 | 5/1987 | Freeman et al. | 360/128 |
| 4,683,506 | 7/1987 | Toldi et al. | 360/105 |
| 4,722,012 | 1/1988 | Toldi et al. | 360/97 |
| 4,740,851 | 4/1988 | Jones et al. | 360/97 |
| 4,787,000 | 11/1988 | Schulze | 360/105 |
| 4,811,143 | 3/1989 | Ohashi et al. | 360/105 |
| 4,901,173 | 2/1990 | Jones et al. | 360/99.04 |
| 4,965,685 | 10/1990 | Thompson et al. | 360/97.01 |
| 4,972,396 | 11/1990 | Rafner | 369/32 |
| 5,027,241 | 6/1991 | Hatch et al. | 360/105 |
| 5,126,905 | 6/1992 | Nomura et al. | 360/105 |
| 5,237,477 | 8/1993 | Hodapp et al. | 360/128 |
| 5,263,008 | 11/1993 | Fujio et al. | 369/13 |
| 5,267,277 | 11/1993 | Nanke | 369/77.1 |
| 5,291,359 | 3/1994 | Wolter | 360/104 |
| 5,291,361 | 3/1994 | Yokota | 360/106 |
| 5,309,624 | 5/1994 | Nishikawa | 360/105 |
| 5,508,864 | 4/1996 | Briggs et al. | 360/106 |
| 5,530,607 | 6/1996 | Spendlove | 360/105 |
| 5,636,085 | 6/1997 | Jones et al. | 360/103 |
| 5,638,241 | 6/1997 | Sonderegger | 360/133 |

FOREIGN PATENT DOCUMENTS

WO 93/18507  9/1993  WIPO .

OTHER PUBLICATIONS

"An Introduction to the Insite 325 FLOPTICAL® Disk Drive", Jim Godwin, SPIE, vol. 1078, Presented at SPIE Optical Data Storage Topical Meeting, 1989.

IBM Technical Disclosure Bulletin, 1979, 22(6), 2450.

*Primary Examiner*—George J. Letscher
*Attorney, Agent, or Firm*—Woodcock Washburn Kurtz Mackiewicz & Norris LLP

[57] ABSTRACT

A linear actuator for carrying a pair of read/write heads into engagement with a surface of a recording medium includes a carriage assembly. The carriage assembly may have a load beam upon which the read/write heads are mounted. A lift wing that is integrally formed with the actuator preferable extends transverse to a longitudinal axis of the actuator. Preferably, the lift wing extends from the sides of the actuator and not the end of the actuator where the read/write heads are preferably mounted. The integral lift wing may have a first portion that extends from one side of the actuator, and a second portion that extends from the other side of the actuator. Preferably, the lift wing does not have a portion which extends beneath or over the width of the load beam portion of the actuator. This lift wing preferably interfaces with a load ramp of the disk drive to position the read/write heads proximal to the surface of the recording medium.

20 Claims, 9 Drawing Sheets

INTEGRAL LIFT WING FOR A DISK DRIVE ACTUATOR

RELATED APPLICATIONS

The present application is related to the following patent applications, all of which are hereby incorporated by reference in their entirety:

Ser. No. 08/866,189, filed on May 30, 1997, entitled "Improved Operating System For Operating an Eject System and a Head Retraction System of a Disk Drive"

Ser. No. 08/881,804, filed on May 30, 1997, entitled "Media Capture to Prevent Head Damage in a Removable Cartridge Disk Drive"

Ser. No. 08/866,225, filed on May 30, 1997, entitled "Head Retraction System for Retracting The Heads of a Disk Drive"

Ser. No. 08/881,803, filed on May 30, 1997, entitled "Steering Magnets To Reduce Magnetic Leakage Flux in a Disk Drive"

Ser. No. 08/881,805, filed on May 30, 1997, entitled "Laminated Steel Return Path With Actuator Support Features" now U.S. Pat. No 5,943,194

Ser. No. 08/866,190, filed on May 30, 1997, entitled "Dual Loop Flex-Circuit For a Linear Actuator",now U.S. Pat. No. 5,963,399

Ser. No. 08/872,712 filed on May 30, 1997, entitled Interlocking Carriage Assembly for Linear Actuator Ser. No. 08/881,806, filed on May 30, 1997, entitled "Head Gimbal Protection For a Disk Drive"

Ser. No. 08/866,168, filed on May 30, 1997, entitled "Flexured Mounting System for Friction Reduction And Friction Linearization in Linear Actuator for Disk Drive", now U.S. Pat No. 5,920,445

Ser. No. 08/881,807, filed on May 30, 1997, entitled "Return Path Geometry to Enhance Uniformity of Force on a Linear Actuator", Now U.S. Pat. No. 5,905,607

Ser. No. 08/866,180, filed on May 30, 1997, entitled "In-Rigger of a Carriage Assembly that Prevents Rotation of the Carriage Assembly" now U.S. Pat. No. 5,969,908

Ser. No. 08/866,227, filed on May 30, 1997, entitled "Disk Drive Barriers That Restrain Movement of the Drive Actuator", now U.S. Pat. No. 5,926,346

Ser. No. 08/866,167, filed on May 30, 1997, entitled "Self-Positioning Lever for Opening the Shutter of a Removable Disk Cartridge", now U.S. Pat. No. 5,930,074

Ser. No. 08/866,177, filed on May 30, 1997, entitled "AA Disk Drive with a Rotatably Mounted Disk Drive Motor"

Ser. No. 08/866,226, filed on May 30, 1997, entitled "Eject System for Ejecting a Disk Cartridge from a Disk Drive"

Ser. No. 08/881,808, filed on May 30, 1997, entitled "Cover for a Disk Drive Assembly", now U.S. Pat. No. 5,936,798

BACKGROUND

1. Field of the Invention

The present invention relates to computer storage devices, such as disk drives, and, more particularly, to apparatus for loading and unloading the read/write heads of a disk drive onto, and off of, a rotating storage medium, and for protecting the read/writes heads from damage due to shock and, in the case of removable cartridge disk drives, from damage that might result during media insertion.

2. Description of the Prior Art

Disk drives for storing electronic information are found in a wide variety of computer systems, including workstations, personal computers, and laptop and notebook computers. Such disk drives can be stand-alone units that are connected to a computer system by cable, or they can be internal units that occupy a slot, or bay, in the computer system. Laptop and notebook computers have relatively small bays in which to mount internal disk drives and other peripheral devices, as compared to the much larger bays available in most workstation and personal computer housings. The relatively small size of peripheral bays found in laptop and notebook computers, can place significant constraints on the designer of internal disk drives for use in such computers. Techniques that address and overcome the problems associated with these size constraints are therefore important.

Disk drives of the type that accept removable disk cartridges have become increasingly popular. One disk drive product that has been very successful is the ZIP™ drive designed and manufactured by Iomega Corporation, the assignee of the present invention. ZIP™ drives accept removable disk cartridges that contain a flexible magnetic storage medium upon which information can be written and read. The disk-shaped storage medium is mounted on a hub that rotates freely within the cartridge. A spindle motor within the ZIP™ drive engages the cartridge hub when the cartridge is inserted into the drive, in order to rotate the storage medium at relatively high speeds. A shutter on the front edge of the cartridge is moved to the side during insertion into the drive, thereby exposing an opening through which the read/write heads of the drive move to access the recording surfaces of the rotating storage medium. The shutter covers the head access opening when the cartridge is outside of the drive, to prevent dust and other contaminants from entering the cartridge and settling on the recording surfaces of the storage medium.

The ZIP™ drive is presently available for workstations and personal computers in both stand-alone and internal configurations. In order to provide a version of the ZIP™ drive for use in laptop and notebook computers, the size constraints of the peripheral bays of such computers must be considered. In particular, for an internal drive to fit in the majority of laptop and notebook peripheral bays, the drive must be no longer than 135 mm. The height of the drive must be in the range of 12 to 15 mm. These dimensions place many constraints on the design of such a drive, and give rise to numerous design problems. Various aspects and features of the present invention address and overcome several of these problems.

In particular, the ZIP™ drive employs a pair of opposing read/write heads for recording and reproducing information on both sides of the storage medium within a ZIP™ disk. The opposing read/write heads are disposed on flexible load beams at the distal ends of respective actuator arms, that allow the heads to fly closely over the respective surfaces of the rotating disk. In presently available internal and external versions of the ZIP™ drive, loading/unloading ramps are employed to spread the read/write heads apart as the head actuator is moved to a retracted position, in which the heads are moved back away from the edge of the storage medium. This process is described, for example, in commonly assigned, co-pending patent application Ser. No. 08/324, 895, filed Oct. 18, 1994, entitled "Head Load/Unload and Cleaning in a Data Storage Device". As disclosed therein, wings attached to the load beams of the actuator ride on opposed ramps fixedly disposed in the drive, as the carriage of the linear actuator moves toward and away from the disk.

As the heads move toward the disk, the wings ride down the opposed ramps, bringing the heads together onto the disk in a controlled manner. As the linear actuator is withdrawn away from the disk, the wings ride up the opposed ramps to again separate the heads. In this retracted position, disk cartridges can be inserted and removed from the disk drive without harming the read/write heads, since they are retracted backwardly a sufficient distance from the edge of the disk cartridge media U.S. Pat. No. 4,663,683 (McNeil) discloses another structure in which wings attached to load beam members ride upon ramped surfaces, or cams, to move the read/write heads of a disk drive onto, and off of, a rotating storage medium. In the actuator disclosed in U.S. Pat. No. 4,663,683, as well as in commonly assigned U.S. Pat. No. 5,530,607, the wings are separate components that must be assembled, or attached, to the load beams during disk drive manufacture.

Because a version of the ZIP™ drive to be used in laptop and notebook computers is preferably only 135 mm in length, and because the size of the ZIP™ cartridge is already established, there will not be enough room in such a drive to be able to retract the heads completely away from the storage medium. As a result, there is a need for a means of protecting the heads during insertion and withdrawal of a disk cartridge. Additionally, vertical size constraints increase the potential for the read/write heads to be damaged when the disk drive undergoes a shock or extreme vibration, as can occur during the handling of a laptop or notebook computer. Various novel and inventive aspects of the present invention address these problems. Also, due to the size constraints and the relative complexity of disk drive devices, there is a need to simplify assembly processes and to reduce the number of parts of disk drives. Other aspects of the present invention satisfy this need.

SUMMARY OF THE INVENTION

The present invention is directed to apparatus for loading and unloading the read/write heads of a disk drive onto, and off of, a rotating storage medium, and for protecting the read/writes heads from damage due to shock and, in the case of removable cartridge disk drives, from damage that might result during media insertion.

According to one aspect of the present invention, an actuator for carrying the read/write head(s) of the disk drive into engagement with a storage medium comprises a carriage assembly that has a load beam upon which the read/write head is mounted, a wing extending from the load beam and being formed integrally therewith, and a ramped surface on which the wing rides to position the read/write head on the surface of the storage medium. By forming the wing integrally with the load beam, the number of parts of the drive is reduced, resulting in a cost reduction. Additionally, the disk drive assembly process is simplified, as the step of attaching a separate wing to each load beam, as is done in the prior art, is eliminated.

According to another aspect of the present invention, a pair of opposed projections are disposed adjacent the read/write head(s) of a disk drive, when the heads are in a retracted position. The opposed projections have opposed angled surfaces that deflect and capture the edge of the storage medium within a disk cartridge, during insertion of the cartridge into the drive, to prevent the edge of the storage medium from damaging the read/write heads. In the preferred embodiment, the opposed projections are formed as part of a load ramp member that includes ramped surfaces along which the integral wings of the load beams of the actuator ride. In one embodiment, the load ramp member has a pair of opposed snaps extending from the side of the member opposite the opposed projections. A core of the load ramp member is hollowed to form a flexible hinge, whereby pressure exerted on the opposed projections causes the pair of opposed snaps to spread apart to facilitate attachment and detachment of the load ramp member to and from other structure within the disk drive.

According to yet another aspect of the present invention, a pair of barriers are disposed on opposite sides of the load beam(s) of the disk drive actuator to constrain lateral movement of the load beam(s) to prevent damage to the read/write head(s) when the disk drive undergoes shock in the lateral direction. In a preferred embodiment, each barrier is disposed adjacent a respective one of the ends of the wing(s) on the load beam(s) of the actuator, and operate to constrain lateral movement of the wings. Also in the preferred embodiment, the barriers are formed as part of the load ramp member mentioned above, and in particular, may be formed as part of the opposed projections that deflect and capture the storage medium.

According to still another aspect of the present invention, a carriage assembly of the disk drive actuator comprises a load beam having a tab extending distally from its distal end, a gimbal having a proximal end connected to the distal end of the load beam, and having a flexure upon which a read/write head is attached, and a restraining member at the distal end of the gimbal through which the tab of the load beam extends. The restraining member contacts the tab when the carriage assembly undergoes shock along a vertical axis, to prevent excessive movement of the gimbal in that direction.

These and other features and advantages of the present invention will become evident hereinafter.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings embodiments that are presently preferred, it being understood, however, that the invention is not limited to the specific methods and instrumentalities disclosed. In the drawings.

DETAILED DESCRIPTION OF THE PREFERRED EMBODIMENTS

Figure 1:
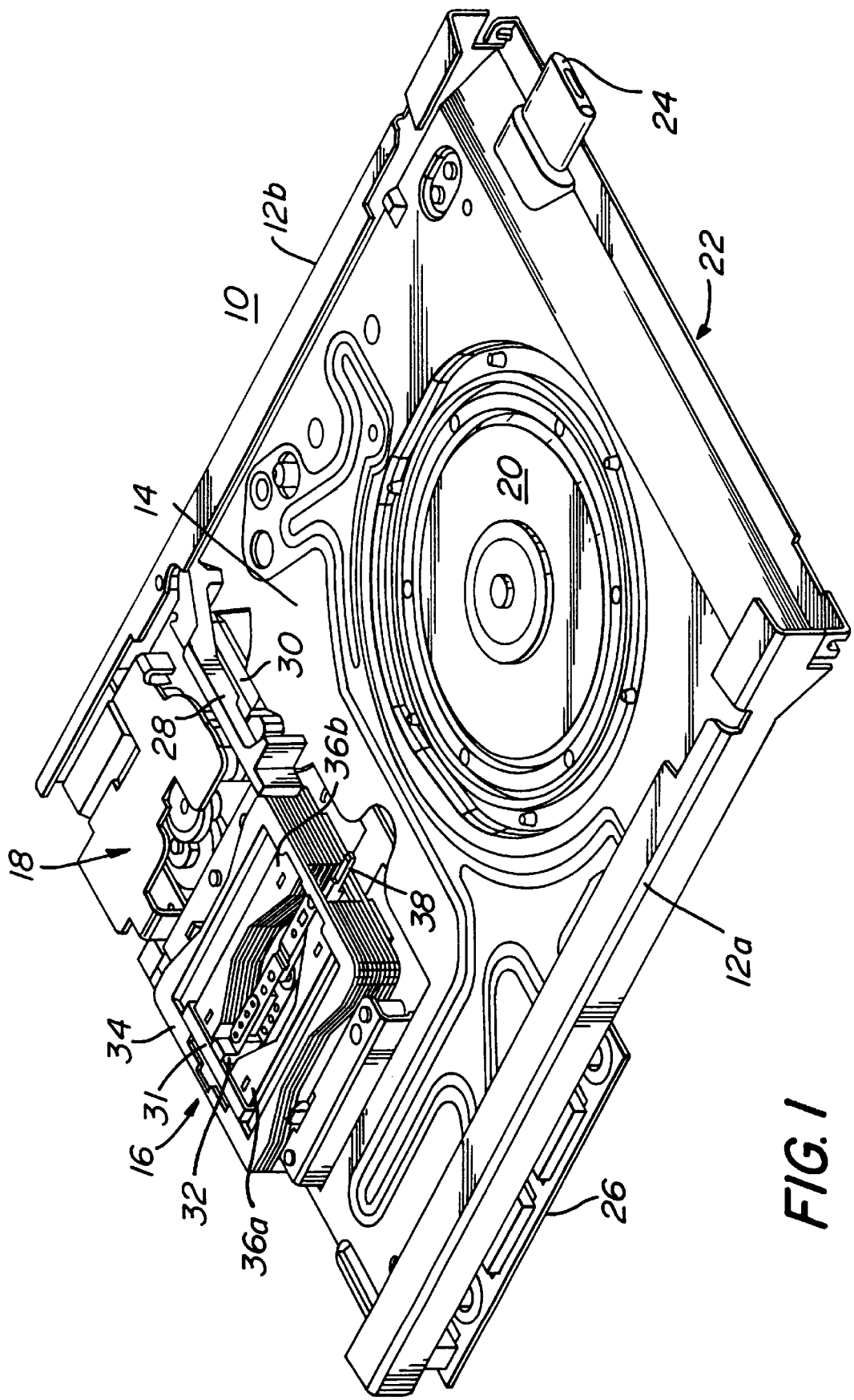
FIG. 1 shows an exemplary disk drive in which the features of the present invention may be employed.

Referring to the drawings wherein like numerals indicate like elements throughout, there is shown in FIG. 1 an exemplary disk drive 10 in which the present invention may be employed. The disk drive 10 comprises a chassis 14 having u-shaped outer edges that form opposed guide rails 12a, 12b that guide a removable disk cartridge (not shown) into the disk drive through opening 22. In the present embodiment, the chassis is metallic. A thin metal top cover (not shown) of the disk drive 10 has been removed so that the internal components of the drive are visible.

A cartridge shutter lever 28 and an eject lever 30 are rotatably mounted on the chassis. Both levers 28 and 30 are shown in FIG. 1 in the positions that they occupy when a disk cartridge is fully inserted into the drive. During cartridge insertion, the shutter lever swings from a forward position to the position shown in FIG. 1. During this movement, an abutment surface on the shutter lever 28 engages a shutter of the disk cartridge and moves the shutter to the side, exposing a head access opening in the front peripheral edge of the cartridge. The eject lever also moves from a forward position to the position shown in FIG. 1, when the cartridge is inserted. In the position shown in FIG. 1, the eject lever is in a cocked position, under spring tension. When it is desired to eject the disk cartridge from the drive 10, an eject button 24 is pushed. Among other things, this causes the eject lever 30 to be released from its cocked position, so that it springs forward to force the disk cartridge backwardly out of the disk drive.

The disk drive 10 also has a linear actuator 16 disposed at the rear of the chassis 14. The linear actuator 16 comprises a voice coil motor including a coil 31 mounted on a carriage assembly 32, an outer magnet return path assembly 34, and two inner return path members 36a, 36b on opposite sides of the carriage assembly 32. After a disk cartridge is inserted into the disk drive 10, the carriage assembly 32 carries a pair of read/write heads 38 over the recording surfaces of a disk-shaped storage medium within the cartridge. A spindle motor 20 is provided on the floor of the chassis 14. During cartridge insertion, the spindle motor 20 is translated vertically into engagement with a hub of the disk cartridge, in order to rotate the disk-shaped storage medium at a relatively high speed. A circuit board 26 is attached to the chassis 14 via a plurality of standoffs (not shown). The circuit board 26 carries the drive circuitry. A gear train mechanism 18 controls movement of the eject lever 30 and movement of a head retract mechanism (not shown) that moves the carriage assembly 32 to a parked position to prevent damage to the read/write heads 38, when the disk drive is not in use.

Figure 2:
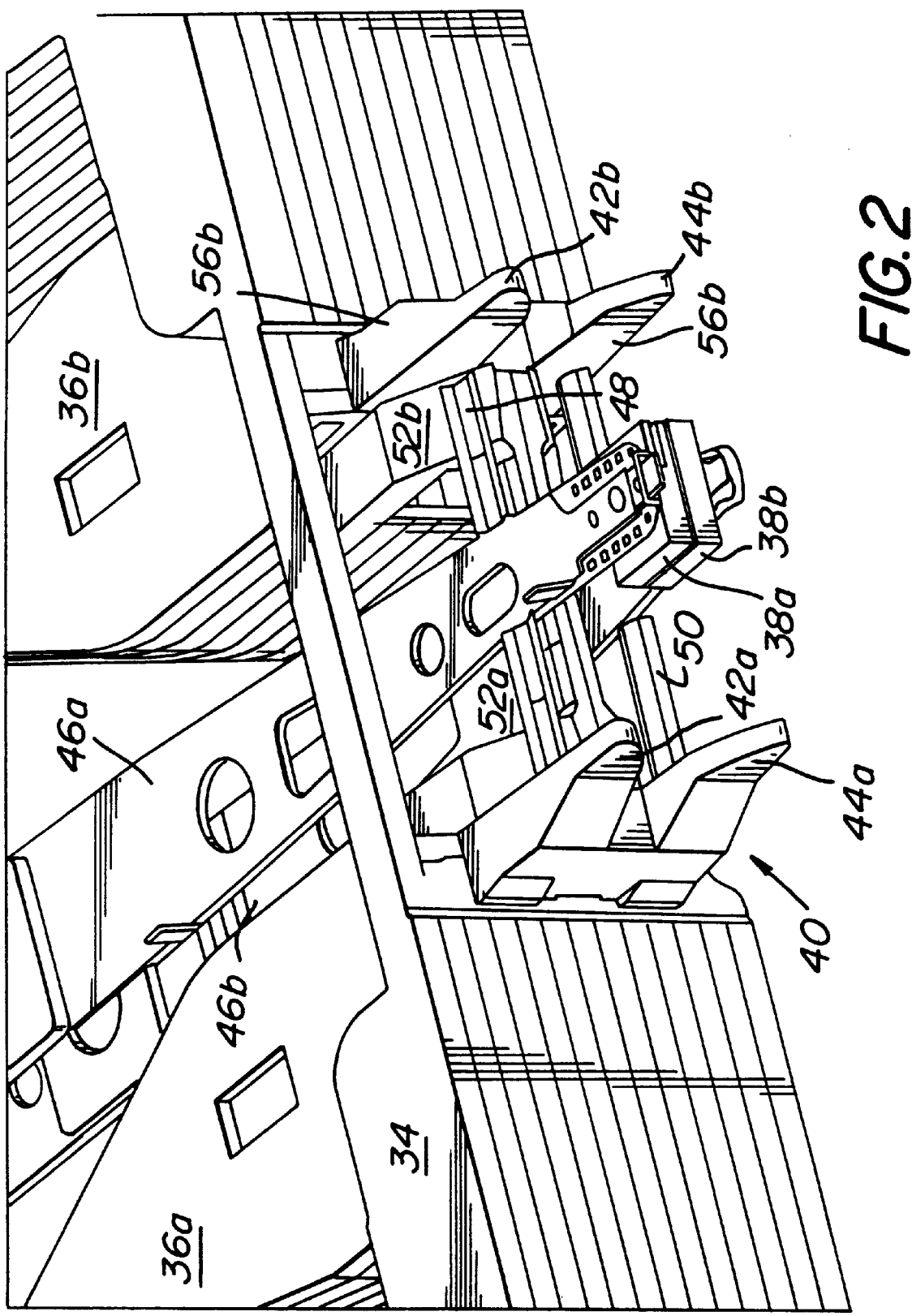
FIG. 2 is an enlarged perspective view of a portion of the disk drive of FIG. 1, showing a load ramp member in accordance with the present invention.
Figure 3A:
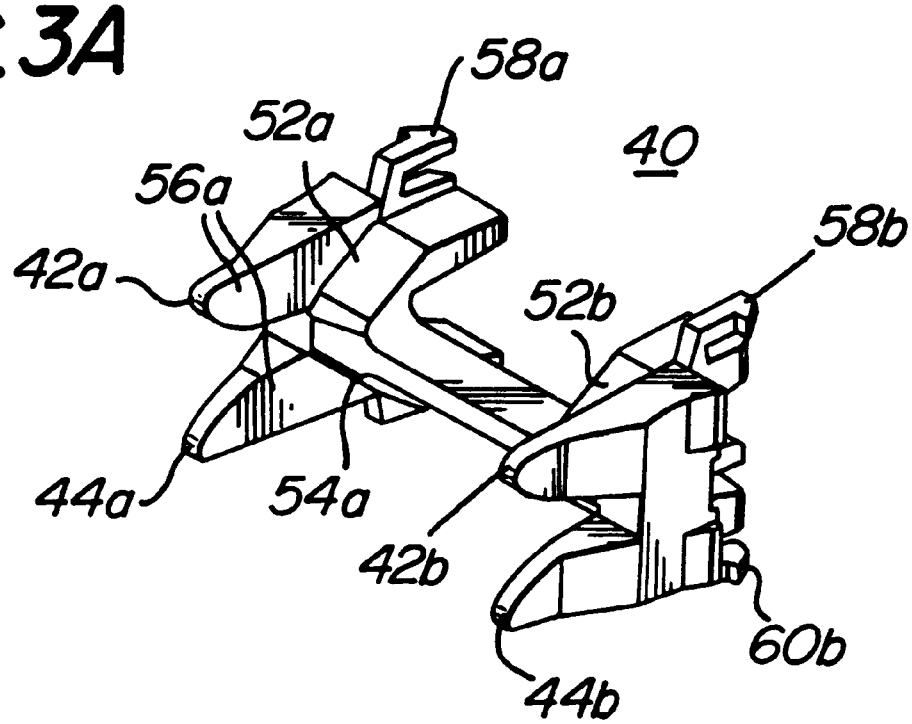
FIGS. 3A and 3B show front and rear perspective views, respectively, of the load ramp member of FIG. 2.
Figure 3B:
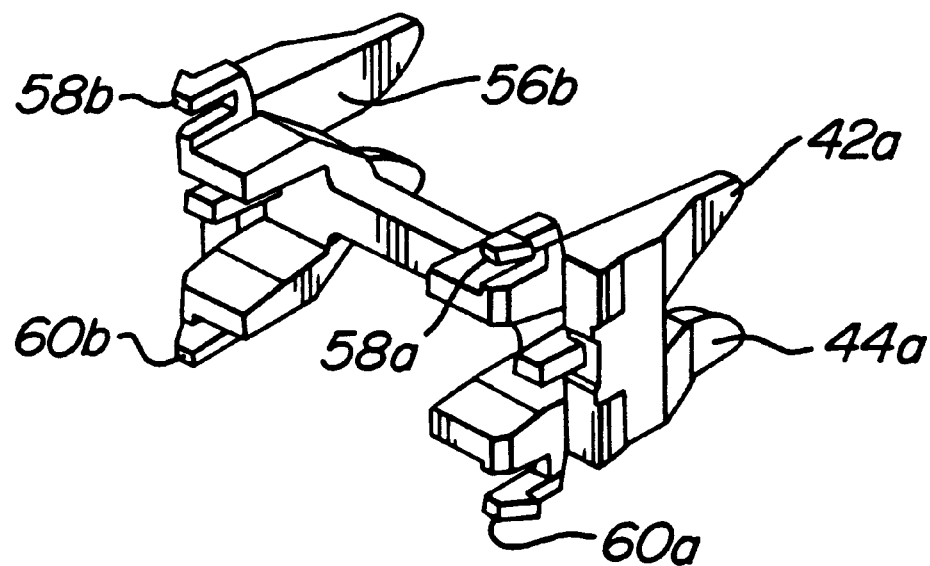
Figure 4A:
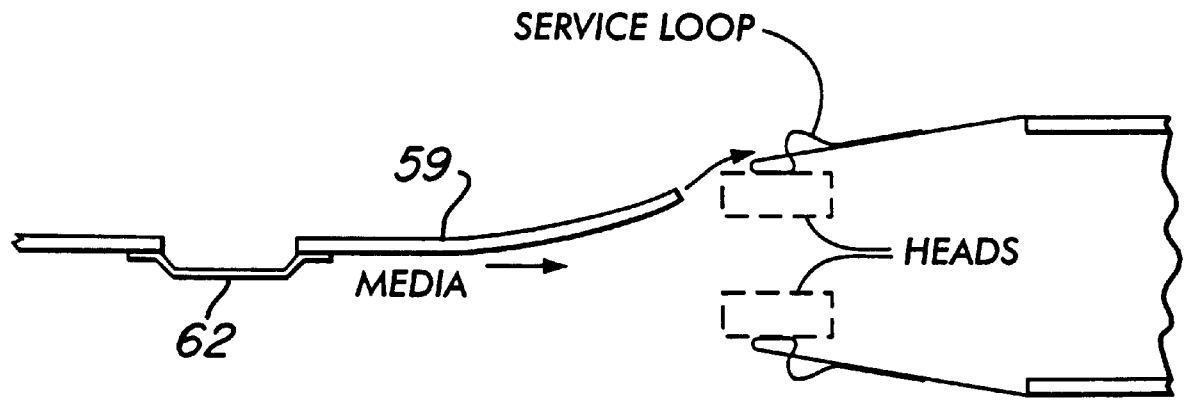
FIG. 4A is a pictorial representation of the problem that arises when the edge of a storage medium is offset vertically during disk cartridge insertion.
Figure 4B:
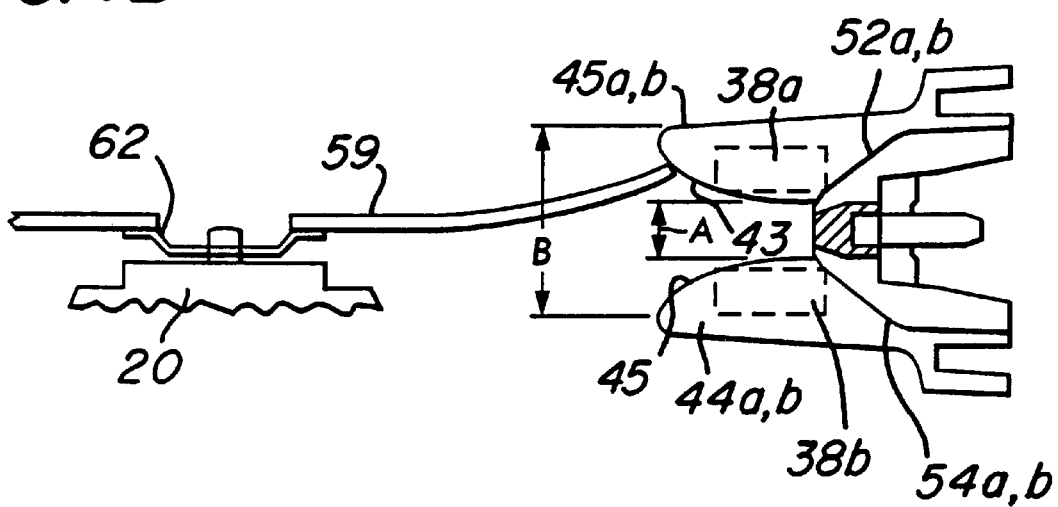
FIG. 4B is a side view of the load ramp member of FIG. 2, illustrating the media capture feature of the present invention.

FIG. 2 is an enlarged view of the disk drive 10 of FIG. 1 showing a portion of the outer return path assembly 34 through which upper and lower load beams 46a, 46b of the carriage assembly 32 extend. A load ramp member 40 is attached to the outer return path assembly 34, which is preferred, although the load ramp member 40 may be attached to any other suitable structure within the disk drive 10. Preferably, the load ramp member 40 is formed of a thermoplastic material. In the preferred embodiment, the load ramp member is formed of polycarbonate loaded with a small percentage of PTFE (as a lubricant). However, any suitable material may be employed. Referring to FIGS. 2, 3, and 4B, the load ramp member is attached to the outer return path assembly 34 by a series of snaps 58a, 58b, 60a, and 60b. Further details of the structure of the outer magnet return path assembly 34 and inner magnet return path members 36a, 36b can be found in commonly assigned, application Ser. No. 08/881,805, entitled "Laminated Steel Return Path with Actuator Support Features" (Attorney Docket: IOM-9508), which is hereby incorporated by reference in its entirety.

The load ramp member 40 has a first pair of opposed ramp surfaces 52a, 54a located on one side of the load beams, and a second pair of opposed ramp surfaces 52b, 54b located on the other side of the load beams 46a, 46b. A wing 48 is attached to the upper load beam 46a, which rides over the ramped surfaces 52a and 52b. A similar wing 50 is attached to the lower load beam 46b, which rides over the ramped surfaces 54a and 54b. After a disk cartridge has been inserted into the disk drive 10, the carriage assembly of the disk drive moves forward toward the disk cartridge. As the carriage assembly moves forward, the wings 48, 50 on the load beams 46a, 46b ride down the respective ramp surfaces 52a,b and 54a,b to bring the respective read/write heads 38a, 38b into engagement with the respective surfaces of the storage medium within the disk cartridge. When the cartridge is to be ejected, the carriage assembly 32 moves rearwardly to a retracted position. As the carriage assembly 32 moves rearwardly, the wings 48, 50 ride back up the ramp surfaces 52a,b and 54a,b to lift the respective heads 38a, 38b off the surfaces of the storage medium.

Integral Lift Wings

In accordance with one aspect of the present invention, the wings 48, 50 are formed integrally with their respective load beams 46a, 46b. In the preferred embodiment, the load beams 46a, 46b and their respective wings 48, 50 are formed of metal. The surfaces of the lift wings 48, 50 that contact the respective ramped surfaces 52a, 52b and 54a, 54b are rounded. Preferably, the load beams 46a, 46b with their integral lift wings 48, 50 are formed of stainless steel, and are formed by first etching a blank of the load beam and integral wing from a thin sheet of stainless steel, and then stamping them in a conventional manner to achieve the desired shaping illustrated in the Figures. Etching a stainless steel sheet to form the load beams is preferably, as tolerances can be more tightly controlled. Alternatively, the load beams can be formed solely by a stamping process, although this is less preferable. By forming the wings integrally with the load beams, the number of parts is reduced, resulting in a cost reduction. Additionally, the disk drive assembly process is simplified, as the step of attaching a separate wing to each load beam is eliminated.

Disk Cartridge Media Capture

Because the disk drive 10 must have a length no greater than 135 mm in order to fit within most laptop and notebook computer peripheral drive bays, there is not sufficient space to retract the read/write heads far enough to clear the edge of the storage medium within the disk cartridge. Thus, in their parked position, the heads will be located over a portion of the edge of the storage medium. Because the vertical position of the media may vary during disk insertion, due to a number of considerations, it is possible that, without some form of protection, the edge of the media might ride up over one of the read/write heads, possibly causing damage to the fine wire (sometimes referred to as a service loop) that runs from the head to the drive electronics along the edge of the load beam. This problem is illustrated pictorially in FIG. 4A. As shown, the disk-shaped storage medium 59, which is attached to a hub 62 within a disk cartridge (not shown), may be vertically out of position during insertion of the cartridge such that it rides up over one of the read/write heads, potentially causing damage to the service loop of that head.

According to a preferred embodiment of one aspect of the present invention, the load ramp member 40 has a pair of opposed projections 42a, 44a and 42b, 44b disposed on opposite sides of the respective opposed ramp surfaces 52a, 54a and 52b, 54b. Referring to FIG. 4B, these projections 42a,b and 44a,b shield the read/write heads 38a, 38b of the disk drive 10 from the edge of the media 59 during disk cartridge insertion, by providing opposed angled surfaces 43, 45 that deflect the edge of said disk-shaped storage medium 59 during insertion and capture the edge of the storage medium between them, thus preventing the edge of the medium 59 from contacting the heads. In the preferred embodiment, the dimensions A and B of FIG. 4B are approximately 0.9 mm and 3.0 mm, respectively, although in other embodiments, these dimensions may be different. While in the preferred embodiment the projections 42a, 44a, 42b, and 44b, are formed as part of the load ramp member 40, they can also be formed separately, or with other structure within the disk drive.

Wing Barrier Preventing Lateral Movement

Because laptop and notebook computers are often subjected to shock, for example, when they are accidentally dropped or jolted, there is a chance that the read/write head carriage assembly may move laterally and vertically within the drive. Excessive movement of the carriage assembly 32 can cause damage to the read/write heads 38a, 38b. For example, excessive lateral movement of the load beams 46a, 46b could cause the read/write heads 38a, 38b to contact the sides of the ramp surfaces of the load ramp member 40, potentially causing severe damage.

Figure 5:
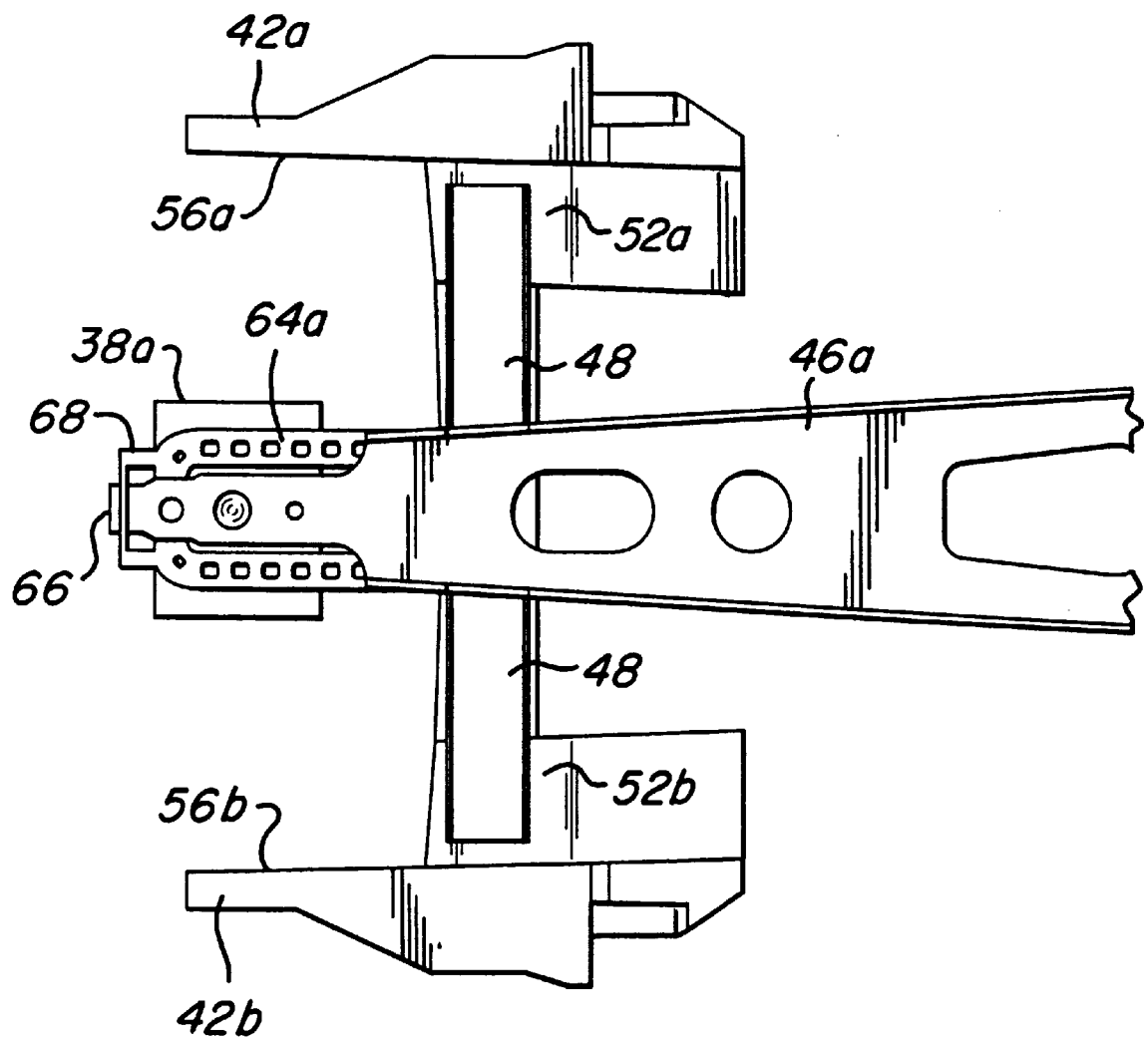
FIG. 5 is a top view of the actuator carriage assembly and load ramp member.

Referring to FIG. 5, according to a preferred embodiment of another aspect of the present invention, barriers 56a and 56b are placed opposite the respective ends of the wings 48, 50 of the load beams 46a, 46b, to prevent excessive lateral displacement of the beams. In the present embodiment, the barriers 56a and 56b are formed as part of the projections 42a, 44a and 42b, 44b. In FIG. 5, it can be seen that the barriers 56a and 56b will prevent excessive lateral displacement of the wings 48, 50, preventing the heads 38a and 38b from contacting any structure of the load ramp member 40.

The barriers 56a and 56b must be far enough apart to provide some clearance for the wings 48, 50, so that contact between them during normal operation of the carriage assembly 32 is avoided, but they must be close enough together to prevent the ends of the wings 48, 50 from sliding off their respective ramp surface 52a, 52b, 54a, 54b. In the present embodiment, the span of each wing 48, 50 is approximately 6.6 mm, and the distance between the barriers 56a and 56b is approximately 7.19 mm. The ramp surfaces 52a and 52b (as well as lower ramp surfaces 54a and 54b) have a span of approximately 4.4 mm between them. The width of each ramp surface 52a, 52b, 54a, 54b is approximately 1.4 mm.

Gimbal Anti-Shock Feature

Figure 6:
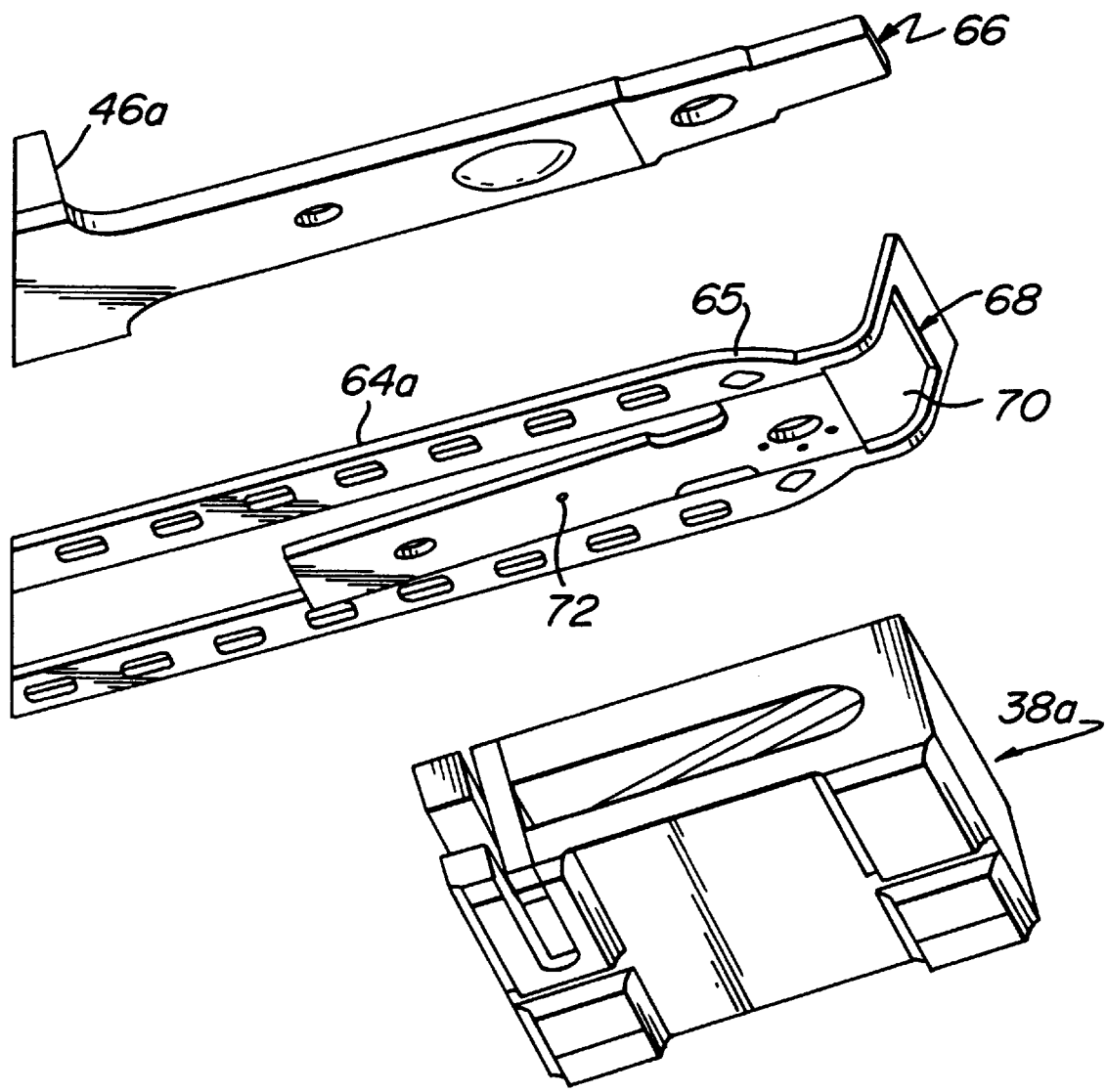
FIG. 6 is an exploded assembly view of a head gimbal assembly in accordance with a preferred embodiment of another aspect of the present invention.

FIG. 6 is an exploded view of a portion of the carriage assembly 32. In particular, the upper load beam 46a, upper gimbal 64a, and upper read/write head 38a are shown. The gimbal 64a is preferably formed of stainless steel, and can be formed using the same etching and stamping process described above for the load beams 46a, 46b and integral wings 48, 50. Additional details of the structure of the carriage assembly 32 can be found in commonly assigned, application Ser. No. 08/866,171, filed May 30, 1997, entitled "Flexured Mounting System for Friction Reduction and Friction Linearization in Linear Actuator for Disk Drive" (Attorney Docket: IOM-9514), which is hereby incorporated by reference in its entirety.

Figure 7:
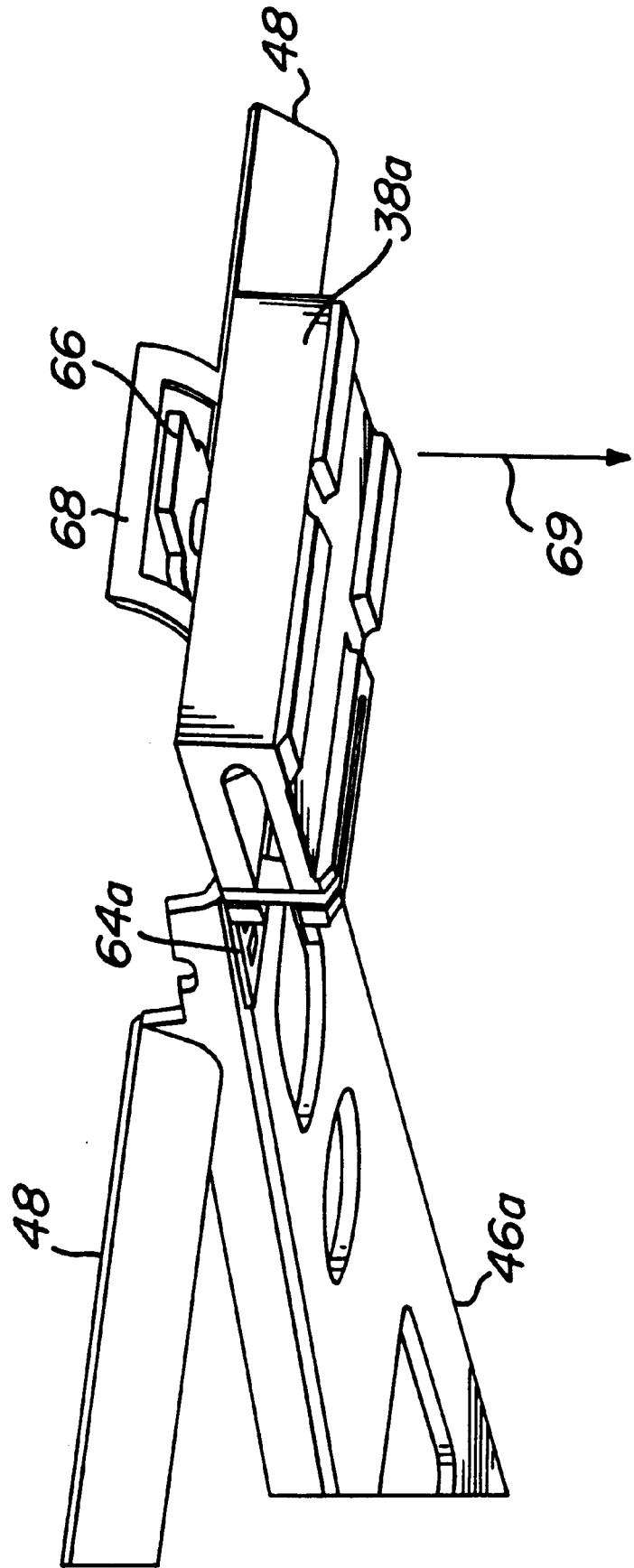
FIG. 7 is a perspective view of the head gimbal assembly of FIG. 6.

A proximal end (not shown) of the gimbal 64a is attached to the load beam 46a in a conventional manner. The opposite end 65 of the gimbal is not attached to the load beam 46a, and thus is free to move as the gimbal 64a bends under force. The read/write head 38a is attached to a flexure 72 of the gimbal 64a, also in a conventional manner. FIG. 7 shows the completed assembly. Because the end 65 of the gimbal 64a is free to move, excessive shock on the carriage assembly 32 along the vertical axis can cause the gimbal 64a and head 38a to bend downwardly (in the direction of arrow 69). Excessive bending of the gimbal 64a in this direction can cause plastic deformation in the gimbal 64a, resulting in permanent damage.

In accordance with a preferred embodiment of an additional aspect of the present invention, the load beam 46a has a tab 66 extending distally from its distal end, and the gimbal 64a has a restraining member 68 at its distal end. The restraining member 68 has a window 70 through which the tab 66 of the load beam 46a extends. Thus, the restraining member 68 captures the tab 66 through window 70. As can be appreciated from FIGS. 6 and 7, the restraining member 68 will contact the tab 66 of the more rigid load beam 46a when the carriage assembly 32 undergoes shock along its vertical axis, thus preventing excessive vertical movement of the gimbal. This prevents plastic deformation of the gimbal under extreme shock.

In the present embodiment, the restraining member is formed integrally with the gimbal, and is bent up from the plane of the gimbal. Additionally, the restraining member is generally rectangular in the preferred embodiment. It is understood, however, that the restraining member may have other shapes, such as oval or circular (not shown). Additionally, in other embodiments, the restraining member may be a separate piece that is mounted to the distal end of the gimbal, as opposed to the integral structure disclosed herein.

Alternate Load Ramp Member Attachment

Figure 8:
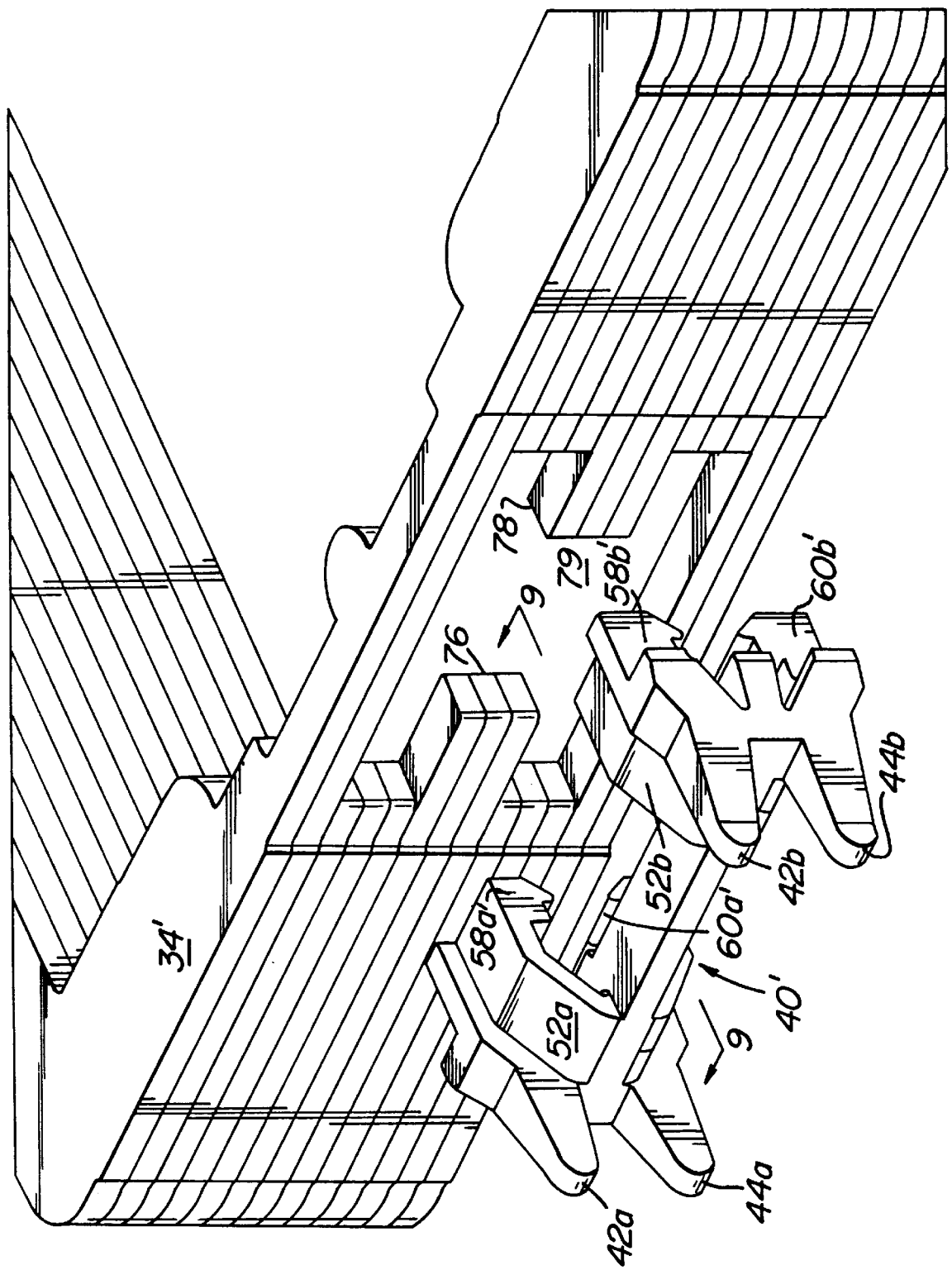
FIG. 8 is a perspective view of another embodiment of a load ramp member in accordance with the present invention.

FIG. 8 shows an alternate embodiment of a load ramp member 40', in accordance with yet another aspect of the present invention. In this embodiment, the load ramp member 40' has two pairs of opposed snaps 58a', 60a' and 58b', 60b' extending from the side of the member 40' opposite the protrusions 42a, 44a and 42b, 44b. In this embodiment, each pair of opposed snaps 58a', 60a' and 58b', 60b' of the load ramp member 40' is snap fit to a respective beam 76, 78 formed in an opening 79 in the outer return path assembly 34'.

Figure 9:
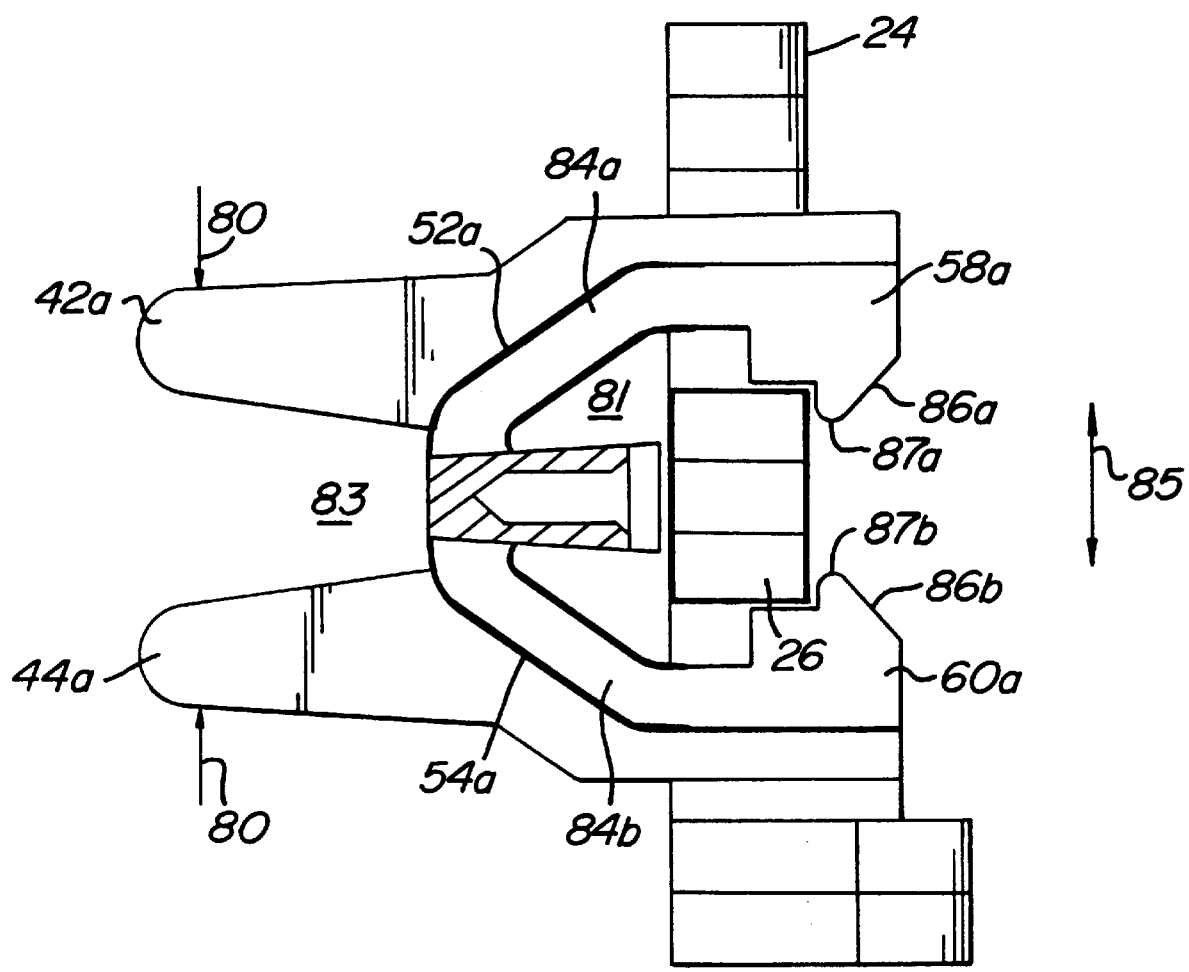
FIG. 9 is a side view of the load ramp member of FIG. 8, illustrating its attachment to an outer return path structure.

Referring to FIGS. 8 and 9, the load ramp member 40' has a hollow core 81 between each pair of opposed snaps 58a', 60a' and 58b',60b', and similarly has a hollow portion 83 between each pair of opposed protrusions 42a, 44a and 42b, 44b. The body of the load ramp member 40' and its hollow core 81 form upper and lower hinges 84a and 84b, the outlines of which are shown in heavy lines. When pressure is applied to the opposed protrusions 42a, 44a in the direction of arrows 80, the hinges 84a and 84b flex, causing the opposed snaps 58a', 60a' to spread apart in the direction of double arrow 85. This ability of the load ramp member 40' can be used to facilitate both attachment and removal of the load ramp member from the beams 76, 78 of the outer magnetic return path 34'. Force can be applied to the opposed protrusions 42a, 44a and 42b, 44b (in the direction of arrows 80) by a user's fingers or by a suitable fixture or tool.

Referring to FIG. 9, in order to facilitate attachment of the load ramp member 40' to the beams 76, 78 of the outer magnetic return path 34', angled surfaces 86a and 86b are provided on the inner edges of the upper and lower snaps 58a' and 60a' (as well as on snaps 58b' and 60b' not shown in this Figure). As the load ramp member 40' is pushed onto the beams 76, 78 during assembly, the angled surfaces 86a and 86b (on both pairs of opposed snaps 58a', 60a' and 58b', 60b') will engage the respective corners of the beams 76, 78. Referring in particular to the snaps 58a', 60a' and beam 76 shown in FIG. 9, engagement of angled surfaces 86a, 86b with the corners of the beam 76, and continued force on the load ramp member 40' toward the outer magnet return path 34', will force the hinges 84a and 84b to flex apart until the inner most tips 87a, 87b of the opposed snaps 58a', 60a' clear the corners of the beam 76. The load ramp member 40' is then pushed further onto the respective beams 76, 78 until the tips 87a, 87b snap around the respective far corners of the beams, as shown in FIG. 9. In accordance with this aspect of the present invention, the load ramp member 40' can be easily removed, or detached, from the beams 76, 78 by applying pressure to the opposed protrusions 42a, 44a and 42b, 44b in the direction of arrows 80, causing the snaps 58a', 60a' and 58b', 60b' to spread apart far enough that the tips (e.g., tips 87a and 87b) of the snaps clear the upper and lower edges of the respective beams 76 and 78.

As the foregoing illustrates, the present invention is directed to apparatus for loading and unloading the read/write head(s) of a disk drive to and from a storage medium and for protecting the read/writes heads from damage due to shock and, in the case of removable cartridge disk drives, from damage that might result during media insertion. Other aspects of the present invention are directed to techniques for part reduction and for simplifying manufacturing. It is understood that changes may be made to the embodiments described above without departing from the broad inventive concepts thereof. For example, while there are two pairs of opposed protrusions 42a, 44a and 42b, 44b, located at opposite ends of the load ramp member, in other embodiments there may be more or less numbers of opposed protrusions. Additionally, the various aspects of the present invention described herein may be employed in disk drives that include rotary read/write head actuators, as opposed to the linear actuator shown in the Figures. Also, the present invention is by no means limited to the particular shapes of the structures disclosed herein Furthermore, while the load ramp member 40 of the present invention is shown, by way of example, as being attachable to an outer magnetic return path assembly of a disk drive, the load ramp member can be attached to any suitable structure with in the disk drive. For example, a special fixture for mounting the load ramp member could be formed within the disk drive. Accordingly, the present invention is not limited to the particular embodiments disclosed, but is intended to cover all modifications that are within the spirit and scope of the invention as defined by the appended claims.

What is claimed is:

1. A linear actuator for carrying a read/write head into engagement with a surface of a recording medium comprising:
    a load beam that is coupled to the read/write head at an end of the load beam, the load beam comprising a first section, the first section being disposed proximate to the end;
    a wing being integrally formed with the load beam and having a first portion that extends outward from a first side of the first section of the load beam and that does not extend inward transversely across the first section of the load beam and a second portion that extends outward from a second side of the first section of the load beam and that does not extend inward transversely across the first section of the load beam.

2. The actuator of claim 1, further comprising a gimbal mounted to the load beam.

3. The actuator of claim 2, wherein the read/write head is mounted to the gimbal.

4. The actuator of claim 2, wherein the gimbal is mounted to the load beam at a first end of the gimbal.

5. The actuator of claim 4, wherein a second end of the gimbal is free to move about the mounted first end of the gimbal.

6. The actuator of claim 5, wherein the second end of the gimbal comprises a restraining member.

7. The actuator of claim 6, wherein the end of the load beam comprises a tab for insertion into the restraining member and thereby restraining movement of the second end of the gimbal.

8. The actuator of claim 1, further comprising a carriage assembly coupled to the load beam for movement of the actuator.

9. The actuator of claim 8, further comprising a voice coil motor coupled to the carriage assembly.

10. A linear actuator for carrying a read/write head into engagement with a surface of a recording medium comprising:
    a load beam comprising a longitudinal axis, a first section that is disposed proximate to an end of the load beam,
    an integral lift wing integrally formed with the load beam, comprising:
        (i) a first portion that extends outward from a first side of the first section of the load beam and transverse to the longitudinal axis of the load beam, but not inward transversely across the first section,
        (ii) a second portion that extends outward from a second side of the first section of the load beam and transverse to the longitudinal axis of the load beam, but not inward transversely across the first section,
        (iii) the wing not extending across a width of the load beam; and
    a gimbal, mounted proximate to the end of the load beam, upon which the read/write head is mounted.

11. The actuator of claim 10, wherein the gimbal is mounted to the load beam at a first end of the gimbal.

12. The actuator of claim 11, wherein a second end of the gimbal is free to move about the mounted first end of the gimbal.

13. The actuator of claim 12, wherein the second end of the gimbal comprises a restraining member.

14. The actuator of claim 13, wherein the end of the load beam comprises a tab for insertion into the restraining member and thereby restraining movement of the second end of the gimbal.

15. The actuator of claim 10, further comprising a carriage assembly coupled to the load beam for movement of the actuator.

16. The actuator of claim 15, further comprising a voice coil motor coupled to the carriage assembly.

17. A disk drive for receiving a disk cartridge, comprising:
(a) a linear actuator, having a first section and an end the first section being coupled to the end, comprising:
 (i) a load beam having an integrally formed wing that has a first portion that extends outward from a first side of the first section, but not inward across the first section and a second portion that extends outward from a second side of the first section, but not inward across the first section;
 (ii) a gimbal coupled to the load beam;
 (iii) a read/write head coupled to the gimbal for interfacing with the disk cartridge;
 (iv) a carriage assembly coupled to the load beam upon which the actuator moves;
(b) an outer return path assembly for providing a force for moving the actuator; and
(c) a load ramp member, coupled to the outer return path assembly, for slidably engaging the wing of the actuator as the actuator moves to engage the disk cartridge.

18. The disk drive of claim 17, wherein the gimbal further comprises a first end that is affixed to the load beam.

19. The disk drive of claim 18, wherein the gimbal further comprises a second end that is free to move about the first end.

20. The disk drive of claim 19, wherein the second end of the gimbal comprises a restraining member.

* * * * *